United States Patent
Goldberg et al.

(10) Patent No.: US 11,656,578 B2
(45) Date of Patent: May 23, 2023

(54) HOLOGRAPHIC IMAGERY FOR ON SET EYELINE REFERENCE

(71) Applicant: Disney Enterprises, Inc., Burbank, CA (US)

(72) Inventors: Evan M. Goldberg, Burbank, CA (US); Alexa L. Hale, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 190 days.

(21) Appl. No.: 16/935,370

(22) Filed: Jul. 22, 2020

(65) Prior Publication Data
US 2022/0026849 A1    Jan. 27, 2022

(51) Int. Cl.
*G03H 1/08* (2006.01)
*G03H 1/00* (2006.01)
*G03H 1/22* (2006.01)

(52) U.S. Cl.
CPC ......... *G03H 1/0866* (2013.01); *G03H 1/0005* (2013.01); *G03H 1/2249* (2013.01); *G03H 2001/2252* (2013.01); *G03H 2210/30* (2013.01); *G03H 2226/02* (2013.01); *G03H 2240/10* (2013.01)

(58) Field of Classification Search
CPC ...... G03H 1/00; G03H 1/0005; G03H 1/0866; G03H 1/2249; G03H 1/02; G03H 1/08; G03H 1/2202; G03H 2001/2252; G03H 2001/0038; G03H 2001/0061; G03H 2001/0204; G03H 2001/2223; G03H 2001/2244; G03H 2001/226–2271; G03H 2001/2281–2284; G03H 2210/30; G03H 2226/02; G03H 2226/05; G03H 2240/10
USPC .......................................................... 359/9
See application file for complete search history.

(56) References Cited

U.S. PATENT DOCUMENTS

| | | | |
|---|---|---|---|
| 8,830,549 B2 | 9/2014 | Govil et al. | |
| 2014/0111856 A1 | 4/2014 | Brug et al. | |
| 2015/0085331 A1 | 3/2015 | Chae | |
| 2017/0017203 A1 | 1/2017 | Matios | |
| 2020/0012097 A1* | 1/2020 | Kubota | B60R 11/02 |
| 2020/0117137 A1* | 4/2020 | Gasking | G02B 27/0103 |
| 2020/0363636 A1* | 11/2020 | Karafin | H04N 1/00098 |

* cited by examiner

Primary Examiner — Stephone B Allen
Assistant Examiner — Jyotsna V Dabbi
(74) Attorney, Agent, or Firm — Dorsey & Whitney LLP

(57) ABSTRACT

Techniques for using holographic imagery for eyeline reference for performers. A first computer generated object is identified for display to a first performer at a designated physical position on a set. A first holographic projection of the first computer generated object is generated using a first holographic display. The first holographic display is configured to make the first holographic projection appear, to the first performer, to be located at the designated physical position on the set. One or more images of the performer are captured using an image capture device with a field of view that encompasses both the first performer and the designated physical position on the set. The captured one or more images depict the first performer and do not depict the first holographic projection. The first computer generated object is added to the captured one or more images after the capturing.

22 Claims, 7 Drawing Sheets

HOLOGRAPHIC IMAGERY FOR ON SET EYELINE REFERENCE

BACKGROUND

The present disclosure relates, in one or more embodiments, to techniques for using holographic imagery for eyeline reference for performers.

Many modern movie and television productions involve computer generated digital effects, including computer generated objects with which a performer interacts (e.g., computer generated characters, items, explosions, visual effects, etc.). These digital effects are commonly added in post-production, after scenes involving live performers and practical effects have been filmed. Because the effects are added in post-production, the live performers are not able to see the computer generated digital objects during filming. Instead, the performer may have to work with a stand-in performer, a stand-in object (e.g., a tennis ball on a stick), or the like.

This can be very challenging for the performer. For example, the stand-in object or stand-in performer may not be precisely placed such that the performer's eyeline and eye vergence do not match the final computer generated object. Even slight differences can make it appear to an audience viewing the finished production that the performer is looking past, or next to, the computer generated object rather than directly at the object. Further, it can be very difficult for the performer to gauge the size of the computer generated object. If the object is large, the performer (or another performer on-set), may inadvertently move into the space that will be occupied by the computer generated object. This can require remedial measures (e.g., re-shoots, additional takes, post-production revisions, etc.) and can be both time consuming and expensive.

Further, the stand-in object or performer often must be removed in post-production so that the stand-in does not appear in the final frame. This is because the stand-in object or performer is also visible to the camera, shows up in the recorded video, and is replaced by the computer generated object after filming. Removing the stand-in object or performer in post-production can be expensive and time consuming.

SUMMARY

Embodiments include a method. The method includes identifying a first computer generated object for display to a first performer at a designated physical position on a set. The method further includes generating a first holographic projection of the first computer generated object using a first holographic display. The first holographic display is configured to make the first holographic projection appear, to the first performer, to be located at the designated physical position on the set. The method further includes capturing one or more images of the performer using an image capture device with a field of view that encompasses both the first performer and the designated physical position on the set. The captured one or more images depict the first performer and do not depict the first holographic projection. The first computer generated object is added to the captured one or more images after the capturing.

Embodiments further include a system, including a processor and a memory storing a program, which, when executed on the processor, performs an operation. The operation includes identifying a first computer generated object for display to a first performer at a designated physical position on a set. The operation further includes generating a first holographic projection of the first computer generated object using a first holographic display. The first holographic display is configured to make the first holographic projection appear, to the first performer, to be located at the designated physical position on the set. The system further includes an image capture device configured to capture one or more images of the performer using a field of view that encompasses both the first performer and the designated physical position on the set. The captured one or more images depict the first performer and do not depict the first holographic projection. The first computer generated object is added to the captured one or more images after the capturing.

Embodiments further include a non-transitory computer program product. The computer program product includes a computer-readable storage medium having computer-readable program code embodied therewith, the computer-readable program code executable by one or more computer processors to perform an operation. The operation includes identifying a first computer generated object for display to a first performer at a designated physical position on a set. The operation further includes generating a first holographic projection of the first computer generated object using a first holographic display. The first holographic display is configured to make the first holographic projection appear, to the first performer, to be located at the designated physical position on the set. An image capture device is configured to capture one or more images of the performer using a field of view that encompasses both the first performer and the designated physical position on the set. The captured one or more images depict the first performer and do not depict the first holographic projection. The first computer generated object is added to the captured one or more images after the capturing.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

In an embodiment, one or more of the challenges described above can be addressed by using a holographic display, within view of the performer but out-of-view of the primary camera(s), to project digital content (e.g., an image of the computer generated digital object). Many holographic displays provide an image that is visible only to viewers with a particular line of sight to the display. These displays can be used to project a holographic image that appears within the performer's eyeline and eye vergence (e.g., at the point at which the performer appears to be gazing with respect to the audience's perspective), as a three-dimensional projection, but that is not visible to the camera(s) recording the scene. This holographic image can be configured to appear, to the performer, to be present at the precise physical location at which the digital content is intended to appear. Further, the holographic image can appear, to the performer, to match the desired physical dimensions of the digital content. Holographic displays present an improvement over methods of conveying such content using flat media devices, such as off-screen monitors, LED screens, etc.

In an embodiment, holographic displays can provide a three-dimensional projection of the digital content, to the performer, at the accurate physical location and with the accurate physical dimensions. This can avoid the appearance of an inaccurate eyeline by the performer (e.g., avoid the appearance that the performer is gazing at the wrong place), and can avoid confusion about the planned dimensions of the physical object. Further, since the three-dimensional projection is not visible to the camera(s), no stand-in is present in the recorded video and no stand-in needs to be removed from the recorded video during post-production. The final digital effects can be added during post-production, without the added burden of removing any stand-in objects.

In one embodiment, the holographic display can remain stationary in view of the performer, and can project the three-dimensional projection in the desired physical location, or locations for a moving projection. Alternatively, or in addition, the holographic display can move when the performer or camera moves so that the holographic display remains out of view of the camera. The holographic display can, for example, track the camera and performer movements. This allows the display to remain within line of sight of the performer, while remaining out of view of the camera. In an embodiment, multiple holographic displays can also be provided, for multiple performers. Each performer can view his or her own personalized holographic projection, while the holographic displays remain out of view of the camera and do not interfere with each other.

Figure 1A:
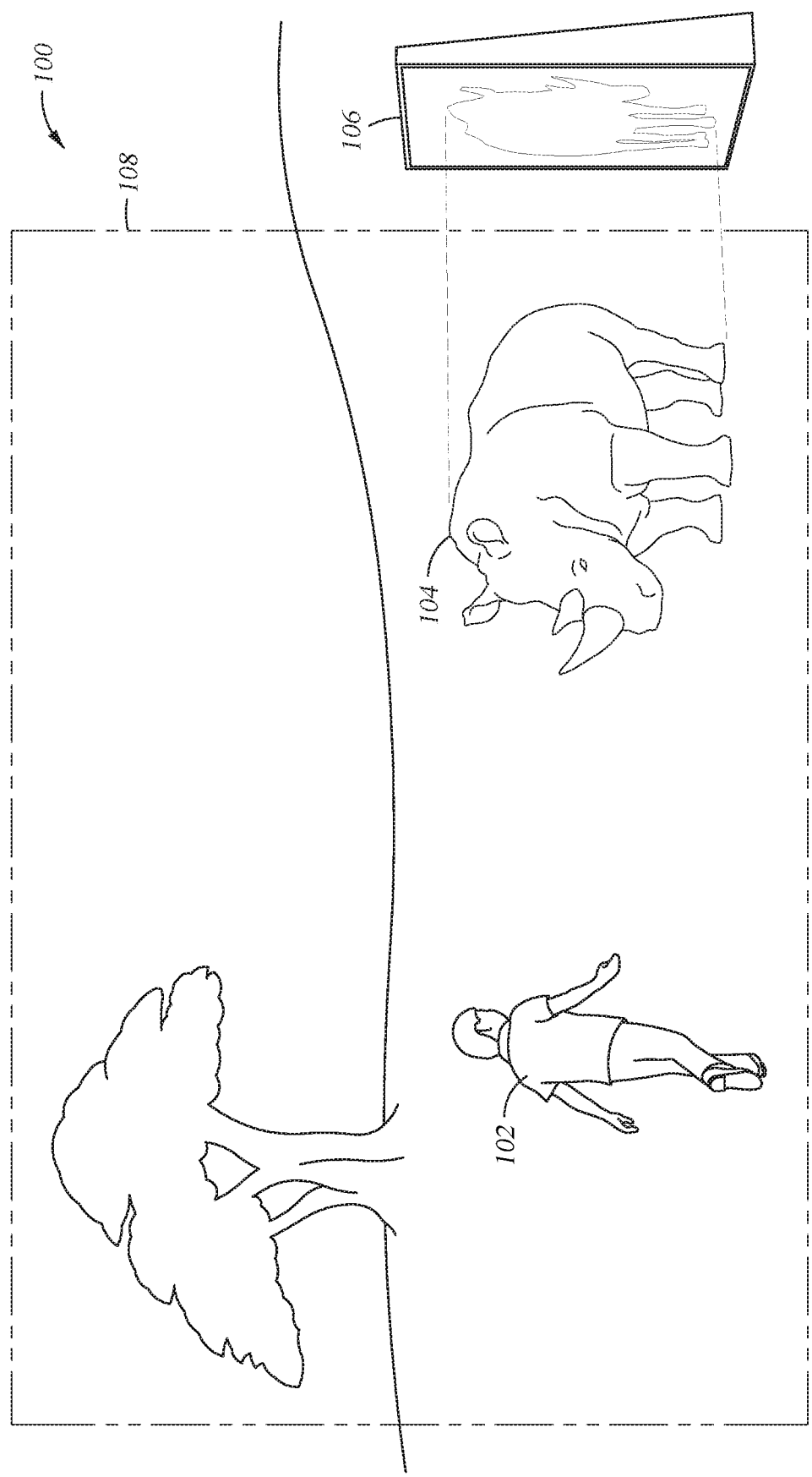
FIG. 1A illustrates a third party view of using holographic imagery for eyeline reference for performers in a movie or television production, according to at least one embodiment.

FIG. 1A illustrates a third party view 100 of using holographic imagery for eyeline reference for performers in a movie or television production, according to at least one embodiment. A performer 102 is acting in a scene (e.g., in a movie, a television production, a streaming production, a recorded theater production, or any other suitable production).

The scene includes a projection 104 of digital content—in this example, a rhinoceros. This digital content will be added to the finished scene in post-production using computer generated digital imagery. In the scene, the projection 104 is provided by a holographic display 106 and is visible to the performer 102. The scene, including the performance by the performer 102, is recorded using an image capture device (e.g., a still camera or a video camera) with a field of view 108. While FIG. 1A depicts one image capture device with the field of view 108, any suitable number of image capture devices can be used.

In an embodiment, the holographic display 106 is within line of sight of the performer 102. The projection 104 appears to the performer 102 as a three-dimensional projection at the physical location at which the digital object will be added in post-production. The projection 104 further appears to the performer 102 to have dimensions matching the digital object to be added in post-production. As discussed in relation to subsequent figures, the projection 104 is not visible to the image capture device with the field of view 108.

In an embodiment, the holographic display 106 can be any suitable holographic display configured to provide a three-dimensional projection to a viewer (e.g., the performer 102). Further, in an embodiment, the holographic display 106 can provide this projection without requiring any glasses or other special equipment from the viewer. Any suitable holographic technique can be used, including laser techniques, other light source techniques (e.g., light emitting diode (LED) techniques), reflective techniques, a combination of light source and reflective techniques, etc.

Figure 1B:
FIG. 1B illustrates a performer view of using holographic imagery for eyeline reference for performers in a movie or television production, according to at least one embodiment.
Figure 1B:
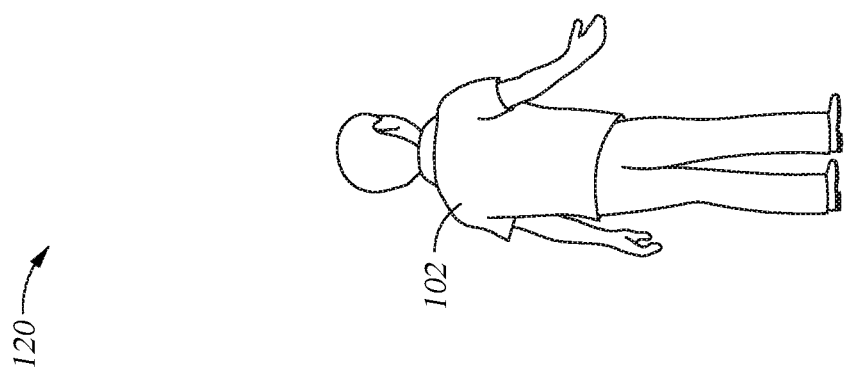

FIG. 1B illustrates a performer view 120 of using holographic imagery for eyeline reference for performers in a movie or television production, according to at least one embodiment. In an embodiment, this is the same scene illustrated in FIG. 1A, but from the perspective of the performer 102. The holographic display 106 is within line of sight of the performer 102. The holographic display 106 provides the three-dimensional projection 104 (e.g., a rhinoceros). This three-dimensional projection 104 is visible to the performer 102, and appears to be located at a physical location matching the eventual post-production insertion of a digital object corresponding to the three-dimensional projection with respect to the performer's perspective. Further, the three-dimensional projection 104 appears to the performer 102 to have physical dimensions matching the eventual digitally inserted object.

Figure 1C:
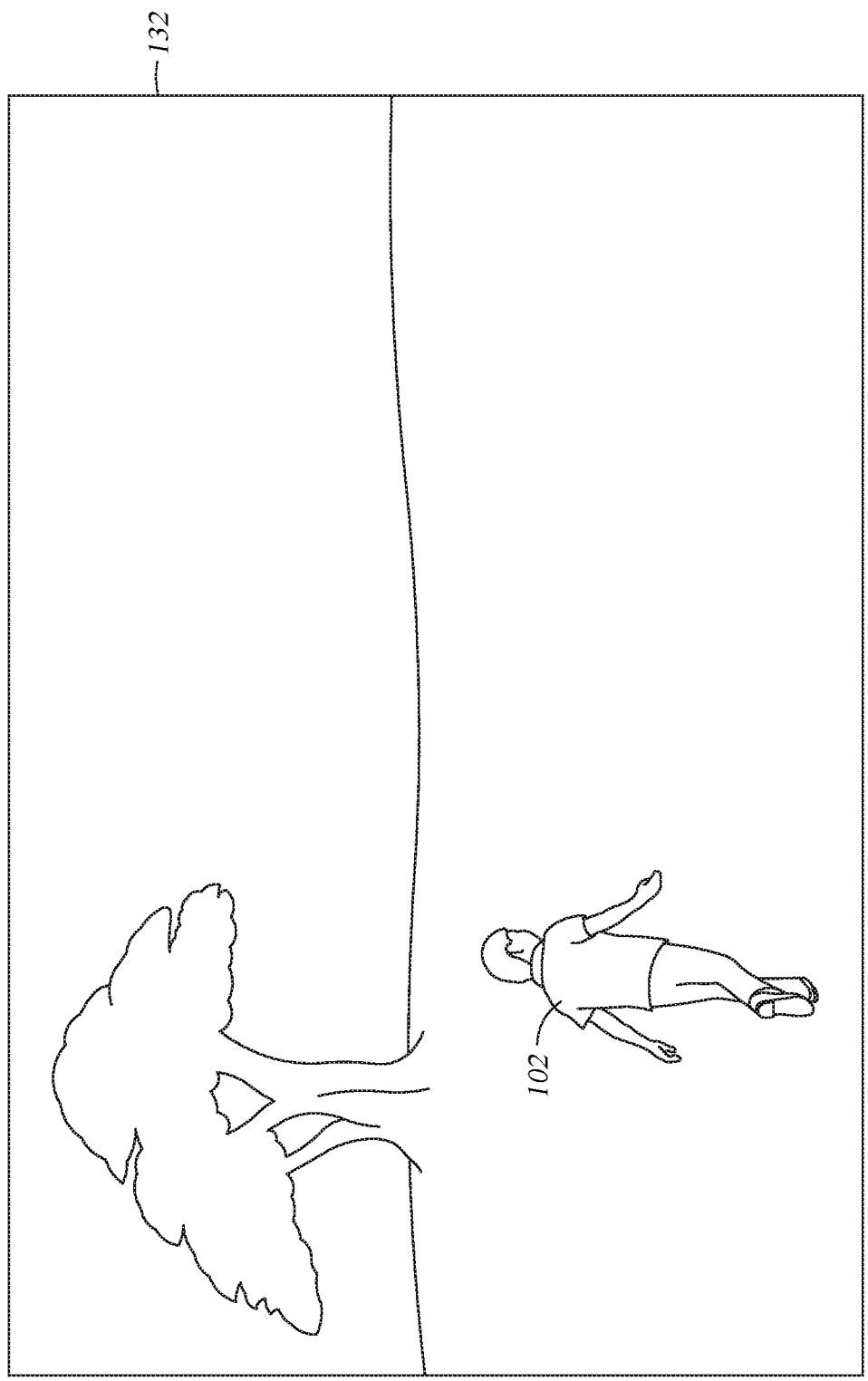
FIG. 1C illustrates a camera view of using holographic imagery for eyeline reference for performers in a movie or television production, according to at least one embodiment.

FIG. 1C illustrates a camera view 130 of using holographic imagery for eyeline reference for performers in a movie or television production, according to at least one embodiment. In an embodiment, this is the same scene illustrated in FIGS. 1A and 1B, from the perspective of the image capture device with the field of view 108. As illustrated, the holographic display 106 is out of the viewing frame 132 of the image capture device, and so it is not visible in the recorded image. Further, the three-dimensional projection 104 is not visible to the image capture device, because the holographic display 106 is not within line of sight of the image capture device. The digital object can be inserted during post-production, and no stand-in objects need to be removed from the captured recording.

Figure 2:
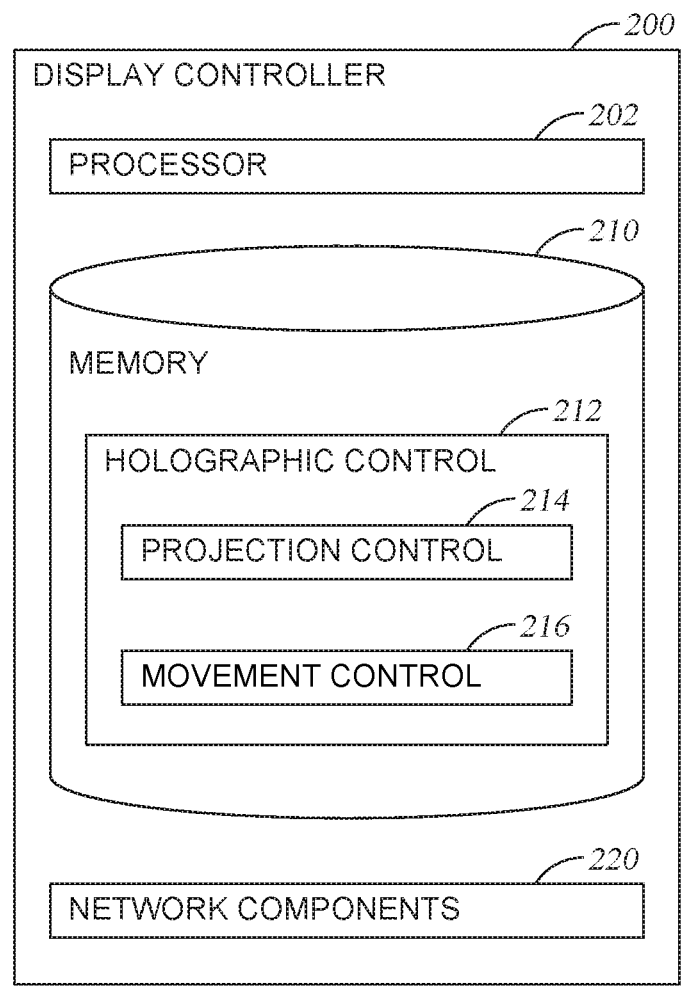
FIG. 2 is a block diagram illustrating a display controller for using holographic imagery for eyeline reference for performers in a movie or television production, according to at least one embodiment.

FIG. 2 is a block diagram illustrating a display controller 200 for using holographic imagery for eyeline reference for performers in a movie or television production, according to at least one embodiment. The display controller 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the display controller 200 to interface with components over a network. For example, the display controller 200 can interface with other electronic studio elements using the network components. The display controller 200 can interface with these elements over a local area network (LAN), for example an enterprise network, a wide area network (WAN), the Internet, or any other suitable network. The network components 220 can include wired, WiFi or cellular network interface components and associated software to facilitate communication between the display controller 200 and a communication network.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the display controller 200. The program code is generally described as various functional "applications" or "services" within the memory 210, although alternate implementations may have different functions and/or combinations of functions.

Within the memory 210, a holographic control service 212 facilitates using holographic imagery for eyeline reference for performers in a movie or television production. For example, as discussed above in relation to FIGS. 1A-C, the holographic control service 212 can control a holographic display (e.g., the holographic display 106 illustrated in FIGS. 1A-C) to provide holographic imagery for eyeline reference for performers in a movie or television production.

In an embodiment, the holographic control service 212 includes a projection control service 214 and a movement control service 216. The projection control service 214 can be used to control display of holographic imagery (e.g., the projected physical location of the digital object and the dimensions of the object). In some embodiments, as discussed above, the holographic display can be configured to physically move on set (e.g., to stay out of view of a moving camera). In these embodiments, the movement control service 216 can be used to control movement of the holographic display (e.g., to track movement of a camera or performers in a scene). This is discussed further below with regard to subsequent figures.

Figure 3:
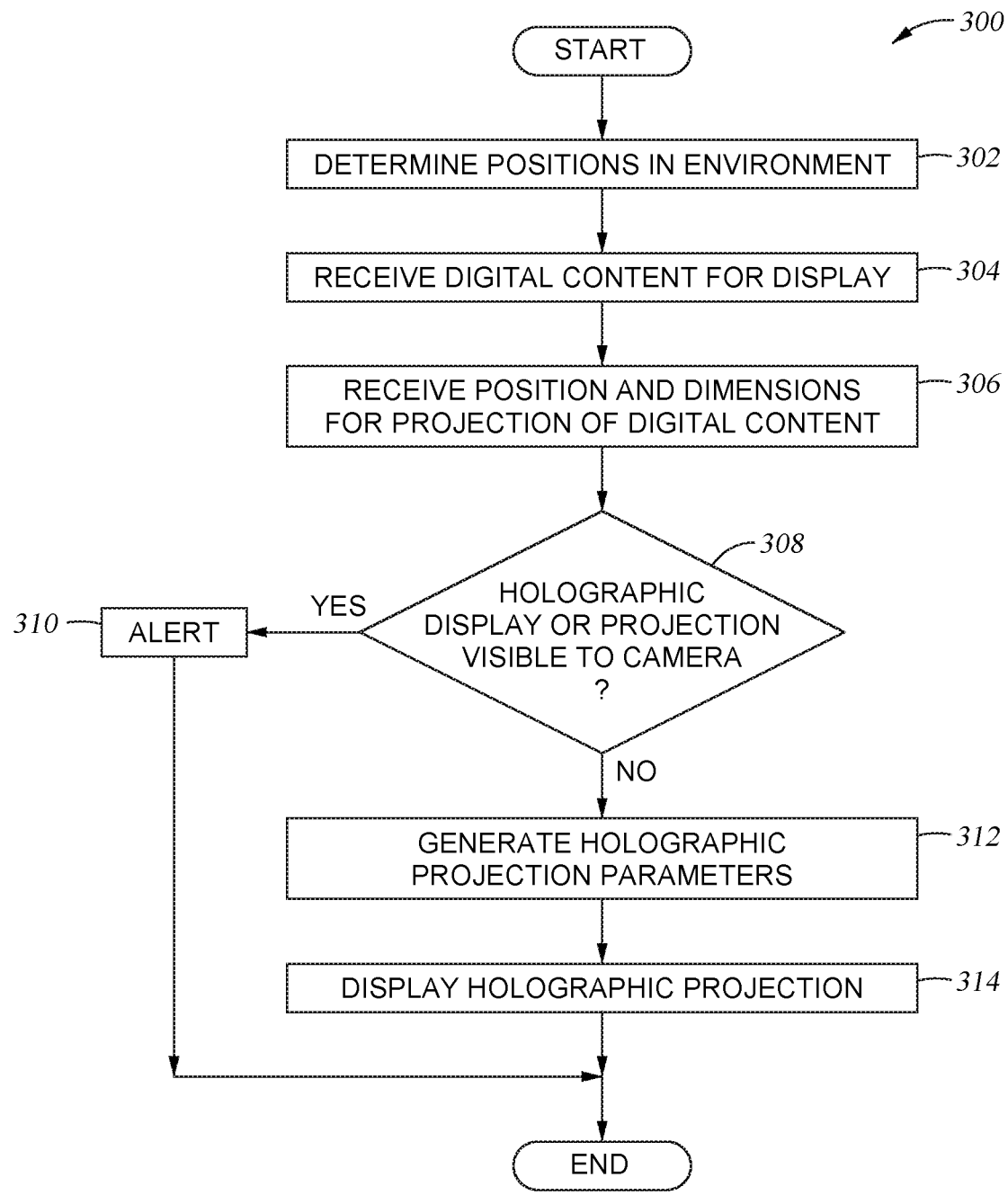
FIG. 3 is a flowchart for using holographic imagery for eyeline reference for performers in a movie or television production, according to at least one embodiment.

FIG. 3 is a flowchart 300 for using holographic imagery for eyeline reference for performers in a movie or television production, according to at least one embodiment. At block 302 a holographic control service (e.g., the holographic control service 212 illustrated in FIG. 2) determines the positions of the elements in the physical environment. For example, the holographic control service can determine the positions of a performer (e.g., the performer 102 illustrated in FIGS. 1A-C), a camera (e.g., the image capture device with the field of view 108 illustrated in FIG. 1A), and a holographic display (e.g., the holographic display 106 illustrated in FIGS. 1A-B). In an embodiment, this information is received at the holographic control service from a user. Alternatively, or in addition, this information can be determined automatically, using an automated device (e.g., a drone), image recognition (e.g., using captured images of the environment), electronic tracking (e.g., using global positions system (GPS) signals), or in any other suitable manner. This is discussed in more detail with regard to FIG. 4, below.

At block 304, the holographic control service receives the digital content for display. For example, this can be one or more digital objects (e.g., characters, items, explosions, visual effects, etc.) that will be added to the production using computer generated imagery techniques (e.g., during post-production). For example, the holographic control model could identify the rhinoceros illustrated in the projection 104 illustrated in FIGS. 1A-B. In an embodiment, this can be a digital graphic (e.g., generated as part of a pre-visualization process or a pre-production process). For example, a digital image, a rendered three-dimensional object, or any other suitable digital content can be provided to the holographic control service.

At block 306, the holographic control service receives the position and dimensions for the holographic projection of the digital content (e.g., the digital content received at block 304) from a suitable source (e.g., as discussed further below). In an embodiment a holographic display generates a three-dimensional image of the digital content, for the performer. The holographic display can configure this image so that it appears to be present at a particular physical location, from the perspective of the viewing performer. In an embodiment, the position can include both a lateral position and a height. The height can be relative to the ground, or relative to another surface or object (e.g., 1 meter above a table). Further, the position information can include multiple positions for multiple objects for projection (e.g., one digital object to be projected relative to another digital object). The position information can further include a movement path for the projection, so that the holographic projection appears to the performer to move over time. In an embodiment, the holographic display remains stationary while the holographic projection appears to move.

The position information can be provided to the holographic control in any suitable manner. For example, positional coordinates (e.g., x and y coordinates in a designated grid) could be used. Alternatively, electronic markers could be used (e.g., GPS or wireless location tracking). For example, a smartphone or other wireless device could be used to mark the position. In an embodiment, a user (e.g., a director, production staff member, etc.) could walk to the correct location and mark the location in an application on a smartphone (e.g., using a general geographic mapping software application, or a proprietary geographic mapping software application). As another alternative, a user could be provided with a digital representation of the filming environment (e.g., the set) as part of a computer software program, and could mark the desired location on the digital representation. This digital representation could be generated using captured images, three-dimensional modeling, or in any other suitable manner.

The holographic display can further configure the generated three-dimensional image so that it appears to have specified physical dimensions, from the perspective of the viewing performer. These dimensions can again be provided in any suitable manner. For example, a user could provide the holographic control service with measured dimensions for the digital object. As another example, a user could provide a three-dimensional model of the object with the desired dimensions. As another example, motion capture techniques could be used to determine the dimensions for a real-world physical object, and these dimensions could be provided to the holographic control service. In an embodiment, the holographic control service can be configured to scale the received dimensions (e.g., to double or halve the physical dimensions of a real world object). As discussed further below, the order of blocks 302-306 is merely one example. The techniques performed at these blocks, and other blocks illustrated in FIGS. 3-6, can be performed in parallel or in any suitable order.

At block 308, the holographic control service determines whether the holographic display, the holographic projection, or both, will be visible to the camera. In an embodiment, the holographic control service has received the positions in the environment of the holographic display, the camera, and the viewing performer (block 302), as well as the desired position for the holographic projection (block 306). The holographic control service can further receive an indication of the field of view of the camera, or can use a default or presumed field of view for the camera. Using this, the holographic control service can calculate whether the holographic display or the holographic projection will be visible to the camera. Further, as discussed above, in an embodiment a set can include multiple cameras. At block 308, the holographic control service can determine whether the holographic display or the holographic projection will be visible to any of these cameras. In an embodiment, a user (e.g., a director, camera operator, or other production staff member) can identify one or more cameras for which an alert will not be generated if the holographic display or holographic projection is visible (e.g., cameras not intended for use in a particular scene, or intended to be used by production staff).

If the holographic display, the holographic projection, or both, are visible to any camera (YES), the flow proceeds to block 310 and the holographic control service provides an alert. In an embodiment, the holographic control service provides an error message or a warning message to a user, indicating that the holographic display and/or projection will be visible to the camera. The user can then choose to stop and correct the proposed positions of the elements on set (e.g., holographic display, holographic projection, or camera (s)), or can choose to proceed. If the user chooses to stop and correct the proposed positions of one or more elements on the set, the holographic control service can be used to analyze the new set configuration (e.g., the flow can restart at block 302 with the new positions).

The holographic control service can provide any suitable alert, including an alert in a software program, an SMS message, an automatically generated telephone call, an e-mail, a messenger alert, etc. In an embodiment, the holographic display service can provide alerts relating to both the holographic display and the holographic projection. Alternatively, the holographic control service can be configured to provide an alert only relating to either the holographic display or the projection, or can be configured to not provide an alert at all.

Returning to block 308, if neither the holographic display nor the projection is expected to be visible to the camera (NO), the flow proceeds to block 312. At block 312, a projection control service (e.g., the projection control service 214 illustrated in FIG. 2) generates the holographic projection parameters. As discussed above, any suitable holographic display technology can be used. At block 312, the projection control service uses the positions of the holographic display and the viewing performer, along with the desired location of the projection, to determine the parameters to use in generating the holographic projection at the desired position, as perceived by the performer. Further, the projection control service uses the received dimensions to determine the parameters to use in generating the holographic projection with the desired dimensions, as perceived by the performer.

At block 314, the holographic control service displays the holographic projection. As discussed above, any suitable holographic display technology can be used. In an embodiment, the holographic control service uses the parameters generated at block 312 to display the holographic projection at the desired physical location, as perceived by the performer, with the desired physical dimensions.

Figure 4:
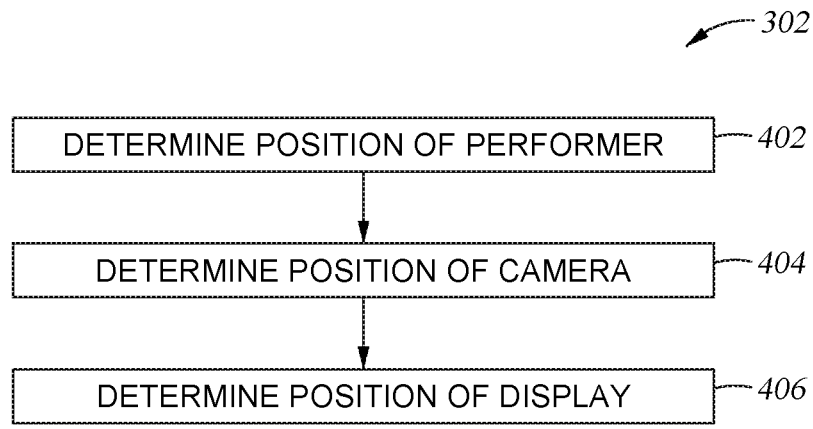
FIG. 4 is a flowchart for determining positions in the environment for using holographic imagery for eyeline reference for performers in a movie or television production, according to at least one embodiment.

FIG. 4 is a flowchart for determining positions in the environment for using holographic imagery for eyeline reference for performers in a movie or television production, according to at least one embodiment. In an embodiment, FIG. 4 corresponds with block 302 illustrated in FIG. 3. At block 402, a holographic control service (e.g., the holographic control service 212 illustrated in FIG. 2) determines the position of the performer in the physical environment. At block 404, the holographic control service determines the position of one or more image capture devices (e.g., cameras) in the physical environment. In an embodiment, a set can include multiple cameras. The holographic control service can determine the position of all of these cameras, or of any subset of the cameras. At block 406, the holographic control service determines the position of a holographic display in the physical environment. As discussed further below, the order of blocks 402-406 is merely one example. The techniques performed at these blocks, and other blocks illustrated in FIGS. 3-6, can be performed in parallel or in any suitable order.

As discussed above, in an embodiment, some (or all) of this position information is received at the holographic control service from a user. For example, a user could be provided with a software program providing a digital representation of the production location (e.g., the set), and could mark the locations using this software program. This might take the form of a tool written on top of digital content creation software (e.g. Autodesk Maya®) or game engines (e.g. Unity® or Unreal®) where objects are placed with 3D manipulators, a standalone application built specifically for this purpose, a virtual reality or augmented reality interface where objects are placed using 6 degree-of-freedom input devices, or a numeric approach in which a user could input location coordinates in a spreadsheet Alternatively, or in addition, this position information can be determined automatically, using an automated device (e.g., a drone), image recognition (e.g., using captured images of the environment), electronic tracking (e.g., using GPS signals or wireless location techniques), LIDAR scanning of locations, or in any other suitable manner. For example, an automated device, like a remote controlled drone, could be used to traverse the production location (e.g., the set) and could be used to mark the various locations of the performer, camera, holographic display, etc. (e.g., using GPS coordinates or wireless location techniques for the automated device). As another example, a series of images, or a video, could be captured of the production location (e.g., using an automated device like a drone, or using a person with an image capture device) and image recognition techniques can be used to discern the locations from the images. As another example, electronic markers could be used (e.g., GPS or wireless location techniques). For example, a smartphone or other wireless device could be used to mark the position. In an embodiment, a user could walk to the correct location and mark the location in an application on a smartphone (e.g., using a general geographic mapping application, or a proprietary geographic mapping application). As another example, one or more of the elements in the scene (e.g., the performer, camera, and holographic display) could be provided with GPS or location trackers used to determine the positions in the scene.

Figure 5:
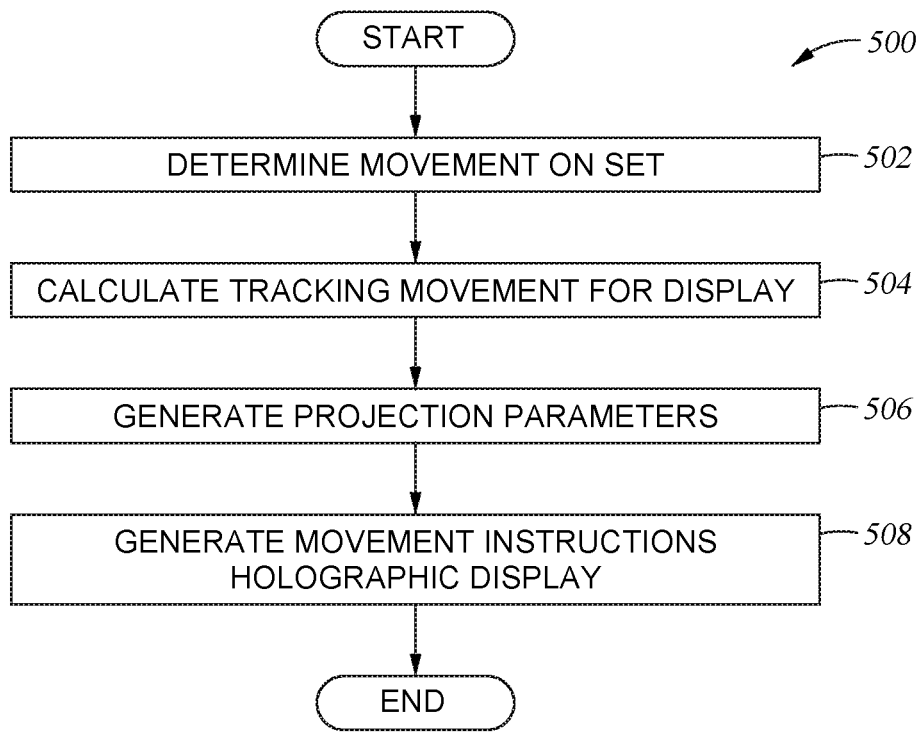
FIG. 5 is a flowchart for using holographic imagery for eyeline reference for performers in a movie or television production with a dynamic set, according to at least one embodiment.

FIG. 5 is a flowchart 500 for using holographic imagery for eyeline reference for performers in a movie or television production with a dynamic set, according to at least one embodiment. As discussed above, in one embodiment a holographic display can remain stationary and generate a holographic projection at a desired apparent physical location, to the performer. Alternatively, or in addition, the set may have moving parts (e.g., the camera(s), performer(s), etc.). In order to remain in view of the performer, while remaining out of view of the camera, the holographic display can also move to track the movement of the other objects on the set.

At block 502, a holographic control service (e.g., the holographic control service 212 illustrated in FIG. 2) determines movement on set. In an embodiment, a set can have various moving parts, including the camera(s), performer(s), and other objects. For example, a performer could walk within the set, and one or more cameras could move to track the movement of the performer. At block 502, the holographic control service receives a description of this movement. Any suitable description can be used, including coordinates describing the motion, a graphical movement path created by a user (e.g., using a software tool), electronic tracking of sample movement (e.g., using GPS or wireless position data during a rehearsal or initial walk-through of a scene), a movement path using automated devices (e.g., a drone), etc.

At block 504, a movement control service (e.g., the movement control service 216 illustrated in FIG. 2) calculates tracking movement for a holographic display. As discussed above, in an embodiment a performer, camera, or both, may be moving. The movement control service can generate a movement path for the holographic display that ensures the display remains within line of sight of the performer, so that the three-dimensional projection remains visible as the performer moves, while remaining out of view of the camera.

For example, assume both the performer and the camera are moving. The movement controller can receive the movement paths for the performer and camera, and can calculate a movement path for the holographic display to track the performer's line of sight, while remaining out of view of the camera. Further, in an embodiment, the movement controller can take into account other characteristics of the scene, including other performers and cameras, other objects on the set, the dimensions of the set, etc. The movement controller can be configured, for example, to keep the holographic display within the boundaries of the set and to avoid other objects on the set, while calculating a movement path to keep the holographic display within line of sight of the performer and out of view of the camera(s).

At block 506, a projection control service (e.g., the projection control service 214 illustrated in FIG. 2) generates projection parameters for the holographic display. As discussed above, the movement controller calculates a movement path for the holographic display to track the performer. As the holographic display moves, the relative position of the performer may change (e.g., to avoid objects on set, or because of differences in movement speed). The projection control service can calculate this change, and can modify the holographic projection parameters (as necessary) to ensure that the holographic projection continues to appear, to the performer, as if it is present in a desired physical location with desired dimensions while the performer and holographic display are moving along their expected paths.

At block 508, the movement controller generates movement instructions for the holographic display. In an embodiment, the holographic display can move based on the tracking movement path calculated at block 504. For example, the holographic display could be attached to a vehicle or cart that is configured to automatically follow a given path. At block 508, the movement controller can generate instructions for the vehicle or cart to follow to automatically move along the calculated path.

Alternatively, the holographic display can be moved by a user. For example, the holographic display can be remotely controlled by a user (e.g., the holographic display can be attached to a remote controlled vehicle). The movement controller can generate instructions for a user to follow (e.g., a graphical path, audio instructions, text instructions, etc.) in remotely controlling the holographic display to move along the calculated path. As another example, the holographic display could be on a rolling cart or another moveable device, and a user could move the holographic display directly. In this example, the movement controller could generate instructions for the user to follow in moving the holographic display (e.g., a path projected along the ground, a graphical path, audio instructions, etc.)

Figure 6:
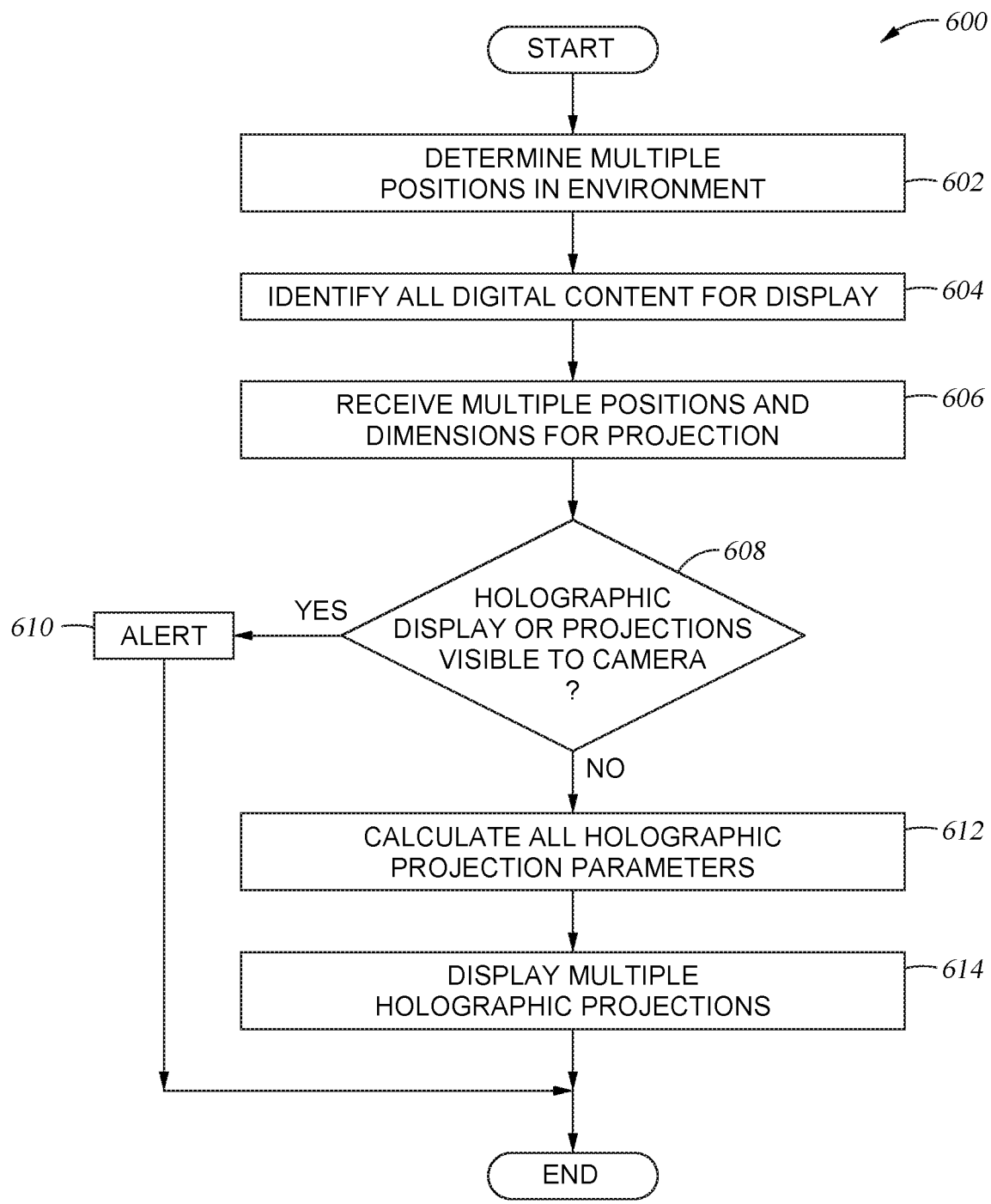
FIG. 6 is a flowchart for using holographic imagery for eyeline reference for multiple performers in a movie or television production, according to at least one embodiment.

FIG. 6 is a flowchart 600 for using holographic imagery for eyeline reference for multiple performers in a movie or television production, according to at least one embodiment. In an embodiment, multiple holographic displays can be used to present holographic projections to multiple performers. Each performer can be provided with his or her own holographic display, placed at a location within line of sight of the performer and presenting the digital content intended to be viewed by that performer. Because each holographic projection is visible only to a performer with the appropriate line of sight for that holographic display, each performer will see only the intended three-dimensional projection for that performer. Alternatively, or in addition, multiple performers can be located within line of site for the same holographic display. In an embodiment, each of the performers will see the same holographic projection.

At block 602 a holographic control service (e.g., the holographic control service 212 illustrated in FIG. 2) determines the positions of the elements in the environment. For example, the holographic control service can determine the positions of the multiple performers, multiple cameras (if applicable), and multiple holographic displays (e.g., one for each performer). In an embodiment, this corresponds with block 302 illustrated in FIG. 3 and blocks 402, 404, and 406 illustrated in FIG. 4, which provide more detail.

At block 604, the holographic control service receives the digital content for display. For example, this can be a digital object (e.g., character, item, explosion, visual effect, etc.) that will be added to the production using computer graphics (e.g., during post-production). In an embodiment, multiple digital objects can be presented to multiple different performers. For example, in a scene with multiple performers, different objects can be presented to the different performers. Alternatively, or in addition, different performers can be provided with different perspective views of the same object, using different holographic displays. For example, one performer might be presented with a view of the front of a digital object, while another performer might be presented with a view of the rear of the digital object, based on the respective positions of the performers on set. This could be done by providing each performer with his or her own holographic display to generate the appropriate projection. Alternatively, or in addition, multiple performers could be provided with the same display, and the viewing angle of each performer could result in a different holographic projection (e.g., different objects or different views of the same objects) for the different performers.

At block 606, the holographic control service receives the position and dimensions for the holographic projection of the digital content (e.g., the digital content received at block 604). As discussed above, in an embodiment the holographic displays generate three-dimensional images of the digital content, for the respective performer. This is discussed in more detail with regard to block 306 illustrated in FIG. 3, above. As discussed further below, the order of blocks 602-606 is merely one example. The techniques performed at these blocks, and other blocks illustrated in FIGS. 3-6, can be performed in parallel or in any suitable order.

At block 608, the holographic control service determines whether any of the holographic displays, or projections, will be visible to any camera. In an embodiment, the holographic control service has received the positions in the environment of the holographic displays, the cameras, and the viewing performers, as well as the desired positions for the holographic projections. As discussed in more detail above, with regard to block 308 in FIG. 3, the holographic control service can calculate whether the holographic display or the holographic projection will be visible to the camera.

If so, the flow proceeds to block 610 and the holographic control service provides an alert. In an embodiment, the holographic control service provides an error message or a warning message to a user, indicating that the holographic display and/or projection will be visible to the camera. This is discussed above with regard to block 310, illustrated in FIG. 3.

Returning to block 608, if none of the holographic displays and projections is expected to be visible to any camera, the flow proceeds to block 612. At block 612, a projection control service (e.g., the projection control service 214 illustrated in FIG. 2) generates the holographic projection parameters. In an embodiment, the projection control service can generate different parameters for each of the holographic displays. Generating the parameters is discussed in more detail above, with regard to block 312 in FIG. 3.

At block 614, the holographic control service displays the holographic projections using the various holographic displays (e.g., one for each respective performer). As discussed above, any suitable holographic display technology can be used. In an embodiment, the holographic control service uses the parameters calculated at block 612 to display the holographic projections at the desired physical locations, as perceived by the respective performers, with the desired physical dimensions.

While illustrated embodiments discussed above discuss using holographic imagery for eyeline reference for performers in a movie or television production, this is merely one example. In an embodiment, a holographic projection could be used to provide an eyeline reference to a performer in a live production (e.g., a theater production) that is not visible to the audience or to another performer. Similarly, a holographic projection could be used to provide an eyeline reference for one party in a production that is not visible to another party. For example, a game show could use holographic imagery to provide a projection visible to one contestant, but not to other contestants or the audience. Further, different holographic displays could provide different holographic projections to different contestants, hosts, etc.

In the current disclosure, reference is made to various embodiments. However, it should be understood that the present disclosure is not limited to specific described embodiments. Instead, any combination of the preceding features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   identifying a first computer generated object for which to provide an eyeline reference to a first performer acting on a set;
   providing the eyeline reference to the first performer by generating, by a holographic control service, a first holographic projection of the first computer generated object using a first holographic display, wherein the first holographic display is configured to make the first holographic projection appear, to the first performer, to be located at a designated physical position for the first computer generated object on the set, wherein the first holographic display is located at a first physical location on the set;
   determining, based on the first physical location of the first holographic display and a field of view of an image capture device, that the first holographic projection will not be visible in one or more images of the first performer and the designated physical position captured by the image capture device;
   capturing the one or more images of the first performer using the image capture device with the field of view such that the captured one or more images depict the first performer and do not depict the first holographic projection; and
   modifying the captured one or more images to add the first computer generated object.

2. The method of claim 1, further comprising:
   receiving a second physical location of the first performer on the set, a third physical location of the image capture device on the set, and the first physical location of the first holographic display on the set, wherein generating the first holographic projection of the first computer generated object is based on the first physical location, the second physical location, and the third physical location.

3. The method of claim 1, further comprising:
   determining that the image capture device is planned to move along a first path during the capturing; and
   calculating a second path for the first holographic display based on the first path and a physical location of the first performer, wherein the first holographic display comprises a movement apparatus used to move the first holographic display along the second path.

4. The method of claim 3, wherein the second path is calculated such that the image capture device does not capture the first holographic display while the image capture device moves along the first path.

5. The method of claim 3, wherein the second path is calculated such that the first holographic projection remains visible to the first performer while the image capture device moves along the first path.

6. The method of claim 1, further comprising:
   generating a second holographic projection of a second computer generated object for a second performer using a second holographic display, wherein the captured one or more images depict the second performer and do not depict the second holographic projection.

7. The method of claim 6, wherein the second holographic projection of the second computer generated object comprises a perspective view of the first computer generated object.

8. The method of claim 1, wherein the set does not include any physical stand-in object representing the first computer generated object, wherein the first computer generated object is added without removing, from the captured one or more images, any depictions of a physical stand-in object representing the first computer generated object.

9. The method of claim 1, further comprising:
   identifying one or more physical dimensions for display of the first computer generated object to the first performer, wherein generating the first holographic projection of the first computer generated object is based on the one or more physical dimensions, and wherein the first holographic display is configured to make the first holographic projection of the first computer generated object appear, to the first performer, to have the one or more physical dimensions.

10. The method of claim 1, wherein the holographic control service includes at least one of: (i) a projection control service configured to control one or more display aspects of the first holographic projection, or (ii) a movement control service configured to control physical movement of the first holographic display.

11. The method of claim 1, wherein the first holographic projection is generated based on one or more holographic projection parameters; and the method further comprises modifying the one or more holographic projection parameters over a period of time such that the first holographic projection remains perceptible by the first performer even as each of the first performer and the first holographic display moves along a respective path over the period of time.

12. A system, comprising:

a processor;

a memory storing a program comprising a holographic control service executable by the processor to perform operations comprising:

identifying a first computer generated object for which to provide an eyeline reference to a first performer acting on a set; and providing the eyeline reference to the first performer by generating a first holographic projection of the first computer generated object using a first holographic display, wherein the first holographic display is configured to make the first holographic projection appear, to the first performer, to be located at a designated physical position for the first computer generated object on the set, wherein the first holographic display is located at a first physical location on the set; and an image capture device configured to capture one or more images of the first performer using a field of view that encompasses both the first performer and the designated physical position on the set, wherein the operations further comprise determining, based on the first physical location of the first holographic display and the field of view of the image capture device, that the first holographic projection will not be visible in the one or more images of the first performer and the designated physical position captured by the image capture device wherein the image capture device captures the one or more images, wherein the captured one or more images depict the first performer and do not depict the first holographic projection, wherein the captured one or more images are modified to add the first computer generated object.

13. The system of claim 12, the operations further comprising:

receiving a second physical location of the first performer on the set, a third physical location of the image capture device on the set, and the first physical location of the first holographic display on the set, wherein generating the first holographic projection of the first computer generated object is based on the first physical location, the second physical location, and the third physical location.

14. The system of claim 12, the operations further comprising:

identifying one or more physical dimensions for display of the first computer generated object to the first performer, wherein generating the first holographic projection of the first computer generated object is based on the one or more physical dimensions and wherein the first holographic display is configured to make the first holographic projection of the first computer generated object appear, to the first performer, to have the one or more physical dimensions.

15. The system of claim 12, the operations further comprising:

determining that the image capture device is planned to move along a first path during the capturing; and calculating a second path for the first holographic display based on the first path and a physical location of the first performer, wherein the first holographic display comprises a movement apparatus used to move the first holographic display along the second path.

16. The system of claim 15, wherein the second path is calculated such that the image capture device does not capture the first holographic display while the image capture device moves along the first path.

17. The system of claim 15, wherein the second path is calculated such that the first holographic projection remains visible to the first performer while the image capture device moves along the first path.

18. The system of claim 12, the operations further comprising:

generating a second holographic projection of a second computer generated object for a second performer using a second holographic display, wherein the captured one or more images depict the second performer and do not depict the second holographic projection.

19. A non-transitory computer-readable storage medium having embodied therewith computer-readable program code of a holographic control service, the computer-readable program code executable by one or more computer processors to perform operations comprising:

identifying a first computer generated object for which to provide an eyeline reference to a first performer acting on a set; and providing the eyeliner reference to the first performer by generating a first holographic projection of the first computer generated object using a first holographic display, wherein the first holographic display is configured to make the first holographic projection appear, to the first performer, to be located at a designated physical position for the first computer generated object on the set, wherein the first holographic display is located at a first physical location on the set, determining, based on the first physical location of the first holographic display and a field of view of an image capture device, that the first holographic projection will not be visible in one or more images of the first performer and the designated physical position captured by the image capture device, wherein the image capture device captures the one or more images, wherein the captured one or more images depict the first performer and do not depict the first holographic projection, wherein the captured one or more images are modified to add the first computer generated object.

20. The non-transitory computer-readable storage medium of claim 19, the operations further comprising:

receiving a second physical location of the first performer on the set, a third physical location of the image capture device on the set, and the first physical location of the first holographic display on the set, wherein generating the first holographic projection of the first computer generated object is based on the first physical location, the second physical location, and the third physical location.

21. The non-transitory computer-readable medium of claim 20, the operations further comprising:

determining that the image capture device is planned to move along a first path during the capturing; and calculating a second path for the first holographic display, based on the first path and a physical location of the first performer, wherein the first holographic display comprises a movement apparatus used to move the first holographic display along the second path.

22. The non-transitory computer-readable storage medium of claim 19, the operations further comprising:

identifying one or more physical dimensions for display of the first computer generated object to the first performer, wherein generating the first holographic projection of the first computer generated object is based on the one or more physical dimensions and wherein the holographic display is configured to make the first holographic projection of the first computer generated object appear, to the first performer, to have the one or more physical dimensions.

\* \* \* \* \*